Oct. 29, 1963 K. RÄNTSCH 3,108,378
CIRCULAR SCALE
Filed June 17, 1960 2 Sheets-Sheet 1
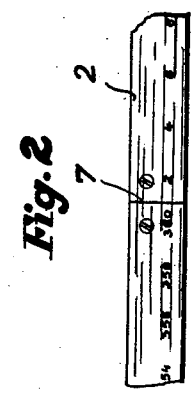
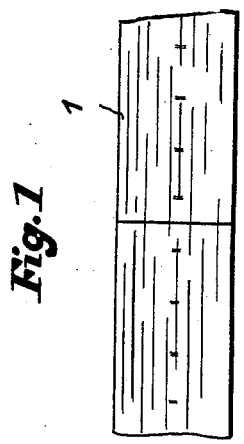
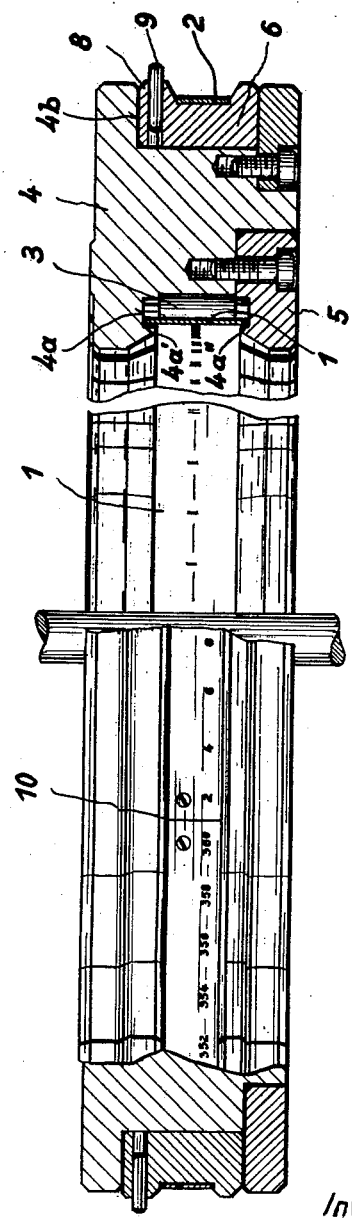
Inventor
KURT RÄNTSCH
By Toulmin & Toulmin
Attorneys Inventor
KURT RÄNTSCH

United States Patent Office 3,108,378
Patented Oct. 29, 1963

3,108,378
CIRCULAR SCALE
Kurt Räntsch, Wetzlar (Lahn), Germany, assignor to M. Hensoldt & Sohne, Optische Werke Aktiengesellschaft, Wetzlar (Lahn), Germany
Filed June 17, 1960, Ser. No. 36,906
Claims priority, application Germany June 18, 1959
6 Claims. (Cl. 33—1)

The present invention relates to measuring scales and more in particular to circular scales.

It is known to provide circular scales by a flexible longitudinal band upon which division strokes are applied while the band remains in horizontal extension, and then to form a circular scale by bending the band around a circular or annular carrier body, so as to obtain a circular scale. Particular difficulties are encountered in maintaining the band in a truly circular arrangement and in accurately positioning the division stroke at the joint of the two ends of the band; in order to accomplish the foregoing it has been suggested to provide stressing means, urging the band radially outwardly. This results, however, in a considerable stress applied to the locks of the band. As a consequence, the ends of the bands are not accurately joining one another, particularly after extended use, and hence the measuring interval of the joint becomes inaccurate.

With the foregoing in mind, it is the object of the present invention to provide a circular scale the measuring intervals of which remain accurate even after extensive and prolonged use.

This object as well as other objects and advantages, which will become apparent as the description proceeds, are achieved by the circular scale of the present invention according to which stressing means are provided, urging the band, bearing the division strokes, radially inwardly.

The tensioning means preferably consists of a plurality of spring rolls supported by a scale body and acting directly on the band with the divisions, so as to urge the same radially inwardly in order to produce an even radial pressure on the band.

It will be found of advantage to have the division strokes located on the radially inwardly disposed surface of the band. Since the stressing means, e.g. the spring rolls, are positioned at the radially outwardly disposed side of the band, this arrangement will protect the highly sensitive division strokes against mechanical damage.

It is also possible to provide an annular rotatable member peripherally surrounding the scale body having, e.g. on another band, numerals for use with the division strokes, Such outer band can be made rotatable independently of the inner band. Preferably, both the numerals and the division strokes are projected together in any desired association on a reading window by a suitable reading unit.

Further features of the invention are explained in the more detailed description below.

The invention will be further explained with reference to the accompanying drawings, wherein FIGURE 1 is a fragmentary view of a portion of the strip or band having division strokes in the circular scale of the invention;

FIGURE 2 is a fragmentary view of a portion of the strip or band having numerals indicating measuring values in the circular scale of the invention;

FIGURE 3 is a fragmentary lateral view, partly in section, of the circular scale according to the invention;

Figure 4:
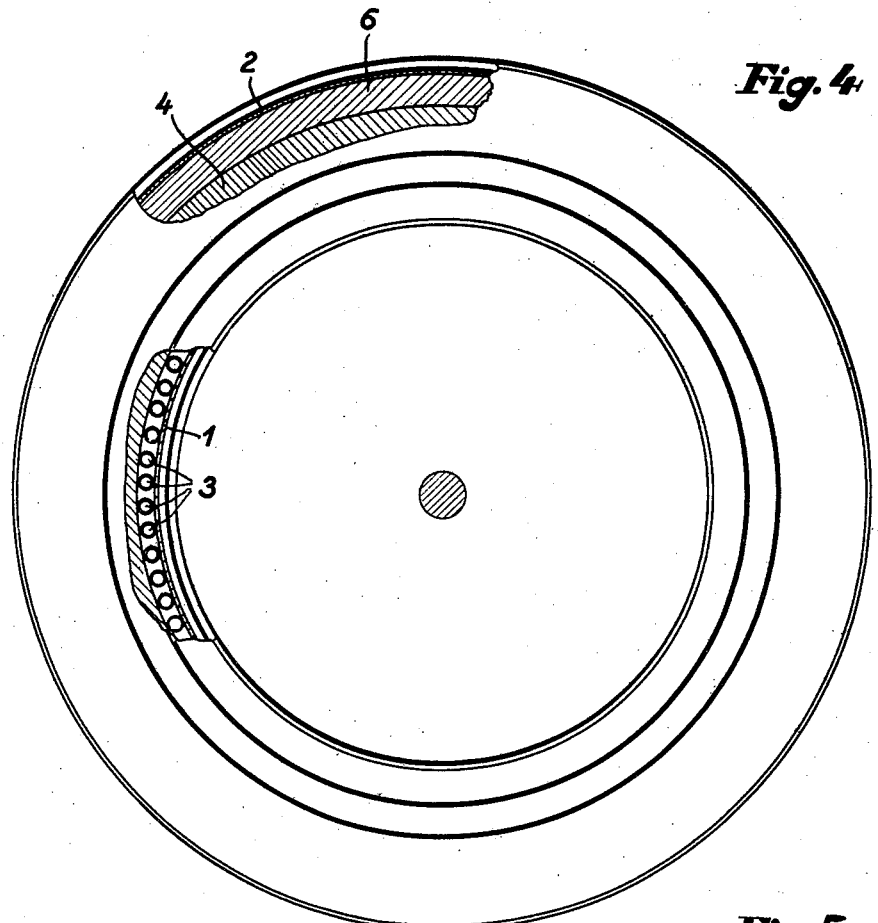
FIGURE 4 is a plan view with some parts broken away of the circular scale of the invention.
Figure 5:
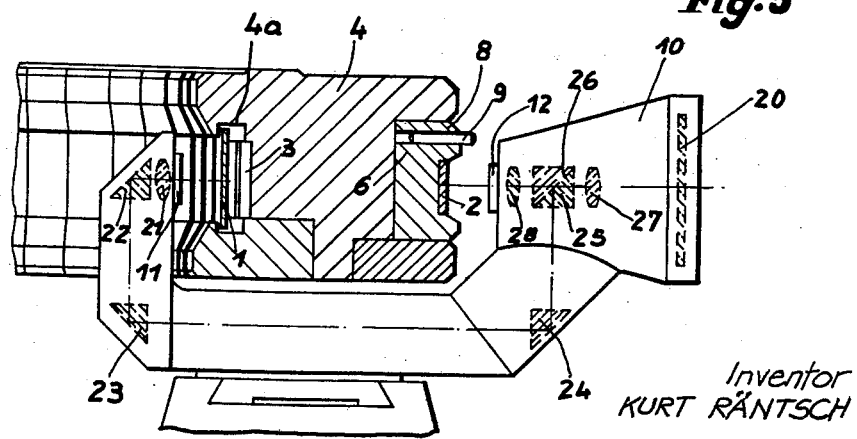
FIGURE 5 is a somewhat schematic, sectional view of a circular scale according to the invention, provided with a reading unit.

Referring next to the drawings more in detail, the circular scale of the invention, as shown by way of an example in the drawings, comprises a perfectly circular scale body 4 having an annular groove 4a receiving a band 1. As shown in FIGURE 1, the band has division strokes spaced at determined intervals, preferably in the form of centimeter-spaced double strokes. A plurality of small spring rolls 3 are compressed between the scale body 4 and the band 1, thereby urging band 1 radially inwardly until the ends of band 1 engage (FIG. 1). The small rolls press the ends of band 1 closely together, as illustrated in FIGURE 1, thereby obtaining the annularly arranged band with the smallest possible diameter. It will be noted in FIGURE 3 that the band 1 is compressed by the small spring rolls and does not contact the portions 4a′ and 4a″ of groove 4a, the reason therefor being that after engagement between the ends of band 1 has been attained (FIG. 1), the band 1 cannot be moved further inwarly any more. Screw ring 5 closes groove 4a from below.

The scale body 4 may have another groove 4b, receiving an annular member 6 rotatable about the axis of the circular scale in said groove 4b relative to said body 4 and pheripherally surrounding the scale body. Annular member 6 supports another band 2, having reference numerals indicative of values of measurement for use with the division strokes on band 1. If desired, member 6 with band 2 can be adapted to be separately rotatable from scale body 4 with band 1. Band 2 preferably consists of the same material as annular member 6 and is glued thereto, and, in addition, is provided with a screw conection 7 (FIG. 2) at the location of the joining ends of the band.

Manual rotation of annular member 6 is facilitated by providing small handles 9.

The circular scale may also comprise a reading unit 10 projecting both the division strokes on band 1 appearing behind window 11, and the numerals of band 2 appearing behind window 12, to a reading window 20, having a reading index or the like. The projection of the division strokes is effected by means of lens 21, prisms 22, 23, 24, a prism 25 with a semi-transparent, specular layer 26, and a further lens 12. The projection of the numerals is effected through lens 28, prism 25 and lens 27.

It will be understood that this invention is susceptible to modification in order to adapt it to different usages and conditions and, accordingly, it is desired to comprehend such modifications within this invention as may fall within the scope of the appended claims.

What I claim is:

1. A circular scale comprising, in combination, a flexible band having a plurality of division strokes and being capable of assuming a circularly bent configuration, a circular scale body surrounding said band, and a plurality of spring rolls compressed between said scale body and said band and constituting stressing means maintaining said band in circular arrangement with interengaging ends and urging the same in radial, inward direction.

2. A circular scale according to claim 1, wherein the division strokes are disposed on the radially inwardly disposed surface of said band.

3. A circular scale according to claim 1, further comprising an annular, rotatable member surrounding said scale body and having a plurality of numerals representing values of measurement for use with the division strokes on said band.

4. A circular scale according to claim 1, further comprising a rotatable annular member surrounding said scale body, and a numeral band on said member having a plurality of numerals representing values of measurement for use with the division strokes on said band.

5. A circular scale according to claim 4, further comprising handle means on said rotatable annular member for rotating the same.

6. A circular scale according to claim 3, further comprising a reading unit for simultaneously observing division strokes on said band and reference numerals on said annular member.

References Cited in the file of this patent

UNITED STATES PATENTS

| | | |
|---|---|---|
| 1,332,571 | Ray | Mar. 2, 1920 |
| 2,584,393 | Lipp | Feb. 5, 1952 |

FOREIGN PATENTS

| | | |
|---|---|---|
| 551,165 | Great Britain | Feb. 10, 1943 |